United States Patent [19]
Stutzenberger

[11] Patent Number: 5,483,934
[45] Date of Patent: Jan. 16, 1996

[54] METHOD FOR OPERATING A FOUR-STROKE INTERNAL COMBUSTION ENGINE WITH EXTERNALLY SUPPLIED IGNITION AND DIRECT INJECTION, AND APPARATUS FOR PERFORMING THE METHOD

[75] Inventor: Heinz Stutzenberger, Vaihingen, Germany

[73] Assignee: Robert Bosch GmbH, Stuttgart, Germany

[21] Appl. No.: 293,271

[22] Filed: Aug. 19, 1994

[30] Foreign Application Priority Data

Sep. 22, 1993 [DE] Germany .......................... 43 32 171.2

[51] Int. Cl.$^6$ ....................................................... F02B 5/00
[52] U.S. Cl. ............................................................ 123/305
[58] Field of Search ..................................... 123/305, 300, 123/295, 531, 434, 672, 472; 364/431.05

[56] References Cited

U.S. PATENT DOCUMENTS

| | | | |
|---|---|---|---|
| 5,020,504 | 6/1991 | Morikawa | 123/531 |
| 5,127,378 | 7/1992 | Ito | 123/300 |
| 5,322,044 | 6/1994 | Maebashi | 123/305 |
| 5,333,583 | 8/1994 | Matsuura | 123/295 |
| 5,359,519 | 10/1994 | Jehanno | 364/431.05 |

FOREIGN PATENT DOCUMENTS 0114991  7/1987  European Pat. Off. ............... 123/305

*Primary Examiner*—Raymond A. Nelli
*Attorney, Agent, or Firm*—Edwin E. Greigg; Ronald E. Greigg

[57] ABSTRACT

A system for reducing fuel consumption in an internal combustion engine and to meet optimal exhaust emissions values.

20 Claims, 2 Drawing Sheets

METHOD FOR OPERATING A FOUR-STROKE INTERNAL COMBUSTION ENGINE WITH EXTERNALLY SUPPLIED IGNITION AND DIRECT INJECTION, AND APPARATUS FOR PERFORMING THE METHOD

BACKGROUND OF THE INVENTION

The invention is based on a method as defined hereinafter. In one such method, known from European Patent Disclosure EP A 1 114 991, the fuel is injected into the applicable combustion chamber of the cylinders of the associated engine in such a way, with the aid of a specially designed fuel injection pump, that in the lower load range of the engine, that is, at partial load, the injection into the engine combustion chamber takes place just before top dead center or immediately before ignition of the fuel-air mixture. Conversely, at full load, in this known injection method the injection takes place in the course of the intake stroke of the engine piston that defines the combustion chamber, in the range between its top dead center and its bottom dead center. Ignition of the fuel-air mixture forming in the combustion chamber is effected by means of a spark plug, and the air delivered to the combustion chamber is supplied unthrottled, or in other words without throttling of the aspirated air by a throttle valve as is otherwise usual in engines with externally supplied ignition. By the known method, the intent is to enable substantially improved filling of the combustion chambers, along with a reduction in fuel consumption, and load regulation is done by controlling the injection quantity. With respect to preparation of the fuel to be injected, the circumstance is taken into account that with a large fuel injection quantity, corresponding to full-load operation, an approximately stoichiometric fuel-air mixture can be established, and the fuel is therefore already introduced at the proper time in the intake stroke of the engine, so that by the time of its ignition it can mix well with the air that is present. At small injection quantities, however, in accordance with the unthrottled delivery of air to the combustion chamber, a substantially larger proportion of air is present in comparison with the fuel introduced, so that an ignitable mixture is nevertheless achieved by later injection, particularly into the vicinity of the spark plug, With a view to the desired reduction in fuel consumption with a simultaneous lowering of all the polluting components of the exhaust gas, however, the known method has the disadvantage that in the partial load range, very high air-fuel ratios of lambda=5 and higher occur; in lean operation as well, crude NOx emissions are high, which because of the air excess cannot be catalytically treated afterward, so that the nitrogen oxide emissions are higher than called for by regulations. Nevertheless, for engines that work with aspirated air throttling and with regulation of the exhaust gas and air composition to lambda=1, the known method has the advantage of substantially better fuel consumption, especially in the partial-load range.

OBJECT AND SUMMARY OF THE INVENTION

By the method according to the invention as defined herein, it is attained that the advantage in terms of fuel consumption offered by the known method is to a larger extent preserved, yet the disadvantage of high pollutant emissions, particularly in the partial-load range, is averted. By controlling the air intake cross section in the particular operating range, improved adaptation of the air number lambda to the desired value of lambda=1 is attained, and by the additional recirculation of exhaust gas in the ensuing operating range, with an air intake cross section that is set to be essentially constant, consumption-reducing lean operation is achieved, with low pollutant emissions, particularly with respect to NOx development.

With the advantageous further feature of optimal lowering of pollutant emissions is attained by regulating the exhaust gas composition in the upper partial-load range; compared with normal operation, in which no exhaust gas recirculation takes place and the intake cross section is unthrottled, the emissions are substantially improved. In this portion of the upper partial-load range, good power output and acceleration capability are also attained, similarly to the situation in the full-load range, while in the ensuing operating range, because of the exhaust gas recirculation and the lean operation that then ensues, a lowering of fuel consumption with good exhaust gas quality is attained.

For the range in which the air intake cross section is controlled, optimal preparation of the introduced fuel is attained by means of an early injection onset; advantageously, the injection takes place in the range of 90° after top dead center of the piston of the applicable cylinder, since in this range optimal air motion occurs, because of the high piston speed.

As a result of the thus-arranged full-load operational range, optimal filling of the combustion chambers is brought about by the nonthrottled air intake cross section, and a desired adjustable enrichment up to air number values of lambda=0.8 to 1.0, at which reliable ignition of the fuel-air mixture still occurs, is attained by controlling the fuel injection quantity as a function of the gas pedal position.

In another feature defined herein, in the range adjoining the upper partial-load range having the controlled air intake cross section, exhaust gas recirculation is initially regulated at an essentially constant air intake cross section setting, in accordance with exhaust parameters, so that at the transition from the upper partial-load range to lower load ranges, very good pollutant emission values are still established; despite the onset of lean operation, NOx development is reduced and charge change losses are also reduced by the additional regulated delivery of recirculated exhaust gas. In the ensuing upper part of the lower load range, in accordance with the invention, the exhaust gas recirculation rate is controlled as a function of the fuel injection quantity or of the gas pedal position, and the increasing leaning is taken into account in the sense that with decreasing load, the injection onset is shifted from the previously adhered-to range of 90° after the onset of aspiration at top dead center to shortly before top dead center in the compression stroke, preferably at a crankshaft angle of 40° to 60° before top dead center. Reliable ignitability is provided for here, and in terms of NOx, pollutant emissions are reduced as a result of the exhaust gas recirculation.

In a further feature the exhaust gas recirculation is suppressed in the lower part of the lower load range, because with the constantly set throttling of the air intake cross section in this range, the filling can be reduced such that together with the injected fuel, at this low load range, an air number lambda of approximately 2.5 results, and at this value high nitrogen emissions do not yet ensue. The fuel injection in this case advantageously again takes place at a late time, so as to attain a still-ignitable mixture for ignition. In this lower load range, which is equivalent to engine idling, acceptable engine smoothness is thus attained with a major reduction in pollutants and consumption, which has a favorable effect that is felt especially if idling is a large proportion of the operation of motor vehicles, for instance in heavy traffic areas.

Controlling the air intake cross section in the upper partial-load range is advantageously done by the gas pedal via a drag member, with whose aid the throttle valve can be moved between a full-load position and a partially open position; the gas pedal can move onward beyond these positions to produce a position transducer signal, by means of which control of the fuel injection quantity is effected. In another advantageous feature, the partial-load stop can be adjusted as a function of the intake tube negative pressure, so that by the position of the throttle valve with a nevertheless essentially constant throttle valve position, a certain adaptation to the degree of filling of the combustion chambers with are and recirculated exhaust gas can be achieved, and overly high lambda values can be avoided. This is especially advantageous for the lower portion of the lower load range.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
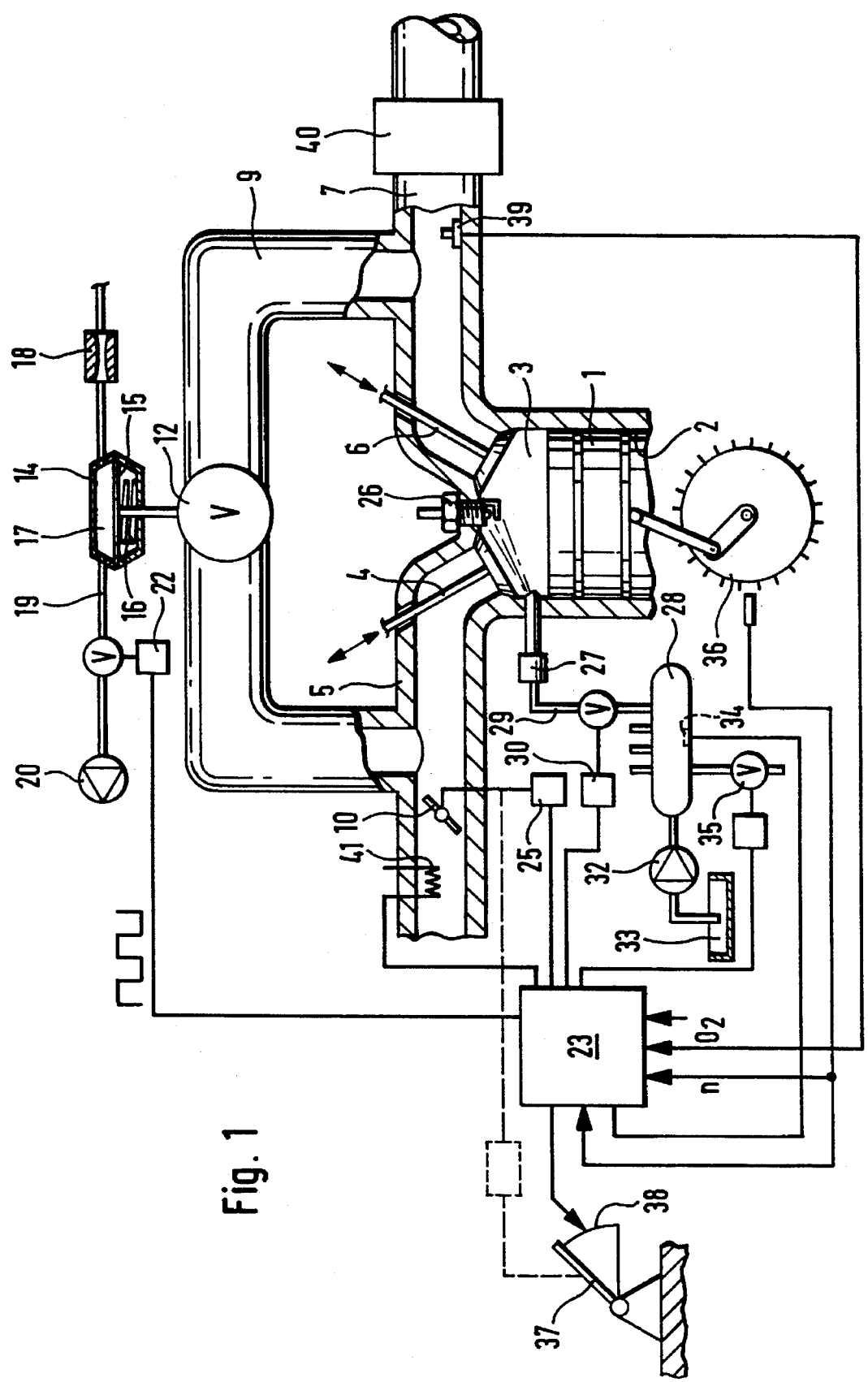
FIG. 1 is a schematic illustration of an internal combustion engine operated by the method of the invention.

FIG. 1, in a rough schematic view, shows a cylinder of a multicylinder internal combustion engine, having a piston 1 that in the cylinder 2 defines a combustion chamber 3, into which an intake line 5 discharges, controlled by the inlet valve 4, and from which an exhaust gas line 7 leads away, controlled by an outlet valve 6. From the exhaust gas line 7, an exhaust gas recirculation line 9 branches off to the intake line 5, downstream of a throttle device 10, which may be a conventional known throttle valve, inserted into the intake line 5. An exhaust gas recirculation quantity control valve 12, which may also be a throttle valve, is located in the exhaust gas recirculation line 9 and in the exemplary embodiment shown is controlled pneumatically, with the aid of a barometric cell 14, which has an adjusting diaphragm 15 with which the valve member of the exhaust gas recirculation valve 12 is coupled and which is acted upon by an adjusting spring 16. This diaphragm divides the barometric cell into a reference pressure chamber and a control chamber 17, which can be relieved via a throttle 18 and can be connected via a negative pressure line 18 to a negative pressure source 20 via a control valve 22, which being triggered in either analog or clocked fashion receives control signals from a control unit 23, by which the pressure in the control pressure chamber 17 is variable.

The control unit 23 also controls the throttle device 10 in the intake line, via an adjusting mechanism 25.

A spark plug 26 and an injection valve 27 protrude into the combustion chamber 3 as well; by means of the injection valve 27, fuel can be injected counter to the compression pressure in the combustion chamber, specifically in such a way that the injected fuel reaches the vicinity of the spark arcing at the spark plug. The injection valve 27 is supplied with fuel from a high-pressure reservoir 28 via an injection line 29, which contains a control valve 30 that is likewise triggered by the control unit 23. The high-pressure reservoir is supplied with fuel, which is brought to injection pressure, by a high-pressure fuel pump 32 that aspirates fuel from a fuel tank 33. The pressure in the high-pressure reservoir may be detected by the control unit 23 by means of a pressure sensor 34; the control unit in turn controls a relief valve 35 of the pressure reservoir so as to maintain a certain reservoir pressure. As an alternative, the feed quantity of the high-pressure fuel pump may also be controlled, so that an unnecessarily large quantity of fuel need not be brought to injection pressure and then unnecessarily drained out again. The other fuel injection valves of the engine are also supplied from the high-pressure reservoir 28, and are controlled by control valves 30 in accordance with this withdrawal of fuel.

The specification of the fuel injection quantity is done by means of a gas pedal 37, with which a position transducer 38 is connected, whose output signal is carried to the control unit 23 in the form of a demand by the driver of the vehicle for torque to drive the engine.

Figure 2:
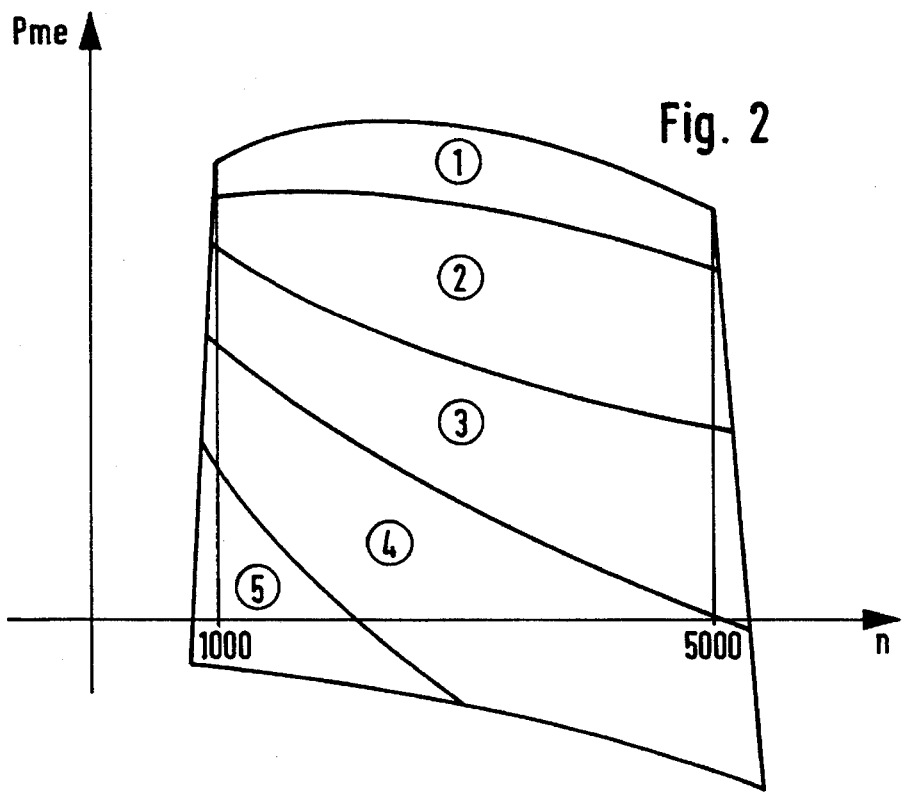
FIG. 2 is a diagram of the operating field of the engine, subdivided into various load ranges in which the engine is operated in accordance with the invention.

In accordance with this torque demand, or vehicle speed demand, the fuel injection quantity is introduced into the combustion chamber 3 by triggering of the control valve 30. The control unit is also connected to an rpm transducer and a crankshaft angle transducer 36 of the engine, so that it can carry out its control functions in phase with the various cylinders of the engine. These are known embodiments that need not be described in detail here. An oxygen sensor 39 is also provided in the exhaust gas line 7; in a known manner, it ascertains the oxygen in the exhaust gas and thus the lambda value or air number lambda. A wide band sensor that can determine the air number lambda is unnecessary; a normal sensor that reacts with a voltage jump at lambda=1 suffices. This oxygen sensor 39 is also connected to the control unit 23 for carrying out the mode of operation of the engine described below. This will be explained in conjunction with FIG. 2. In FIG. 2, the performance graph of an engine is plotted, with the mean pressure Pme over the rpm n. This performance graph is divided into ranges, one above the other; range 1 is equivalent to the full-load range of the engine. In this range, according to the invention, the above-described engine is operated in such a way that the throttle device 10 is fully opened, so that no throttling of the aspirated air via the intake cross section takes place. In accordance with the position of the gas pedal 37 that represents this operating range, the full-load fuel quantity is brought to injection by means of the control unit. With the aid of the triggering of the control valve 30, the instant of injection can be determined by the opening instant of the control valve, and the injection quantity can be determined by the duration of opening of the control valve. For this full-load range, the fuel is injected according to the invention into the combustion chamber 3 in the range of the intake stroke of the piston 1. Advantageously, this injection takes place in a range where optimal air conditions prevail in the combustion chamber, which is true in the range of the highest piston motion speeds, from shortly before to shortly after 90° after top dead center of the piston. By means of this injection it is assured that by the instant of ignition, via the further intake stroke and the ensuing compression stroke, the introduced fuel can mix optimally with the introduced air quantity, so that at the instant of ignition a readily ignitable and completely combustible mixture is present. In this operating range, the exhaust gas recirculation valve is closed, so that no exhaust gas recirculation takes place, and thus depending on the controlled fuel injection quantity and the aspirated air quantity, a mixture is established that is in the range of lambda 0.8 to 1.0, or in other words a range in which the best torque buildup can be expected and a reliable combustion that nevertheless is compatible in terms of exhaust gas takes place.

The operating range 1 is adjoined by an operating range 2, where the engine is operated at an air value of lambda=1, without exhaust gas recirculation. To that end, in the upper partial-load range adjoining it, the throttle device 10 is adjustable in accordance with the adjustment of the gas pedal, so that at a fully open position, beginning at full load, a decrease in the intake cross section takes place as the load decreases. At the same time, the fuel injection quantity is varied such that as a result of this control, and air ratio of lambda=1 is established. In that range, regulation can also be done to a stoichiometric air ratio of lambda=1, with the aid of the output signals of the oxygen sensor 39; the fuel injection quantity is additionally regulated in accordance with these signals. As in the above-described range 1, then injection again takes place during the intake stroke, in a crankshaft angle range of approximately 90° after top dead center of the piston. In this mode of operation, exhaust emissions can also be positively reduced by means of a catalytic converter 40 disposed downstream. The result is a good power output in the high load range with optimally reduced pollutant emissions; however, this is at the cost of somewhat higher fuel consumption, compared with operation with lean mixture formation as is known in the prior art.

Figure 3:
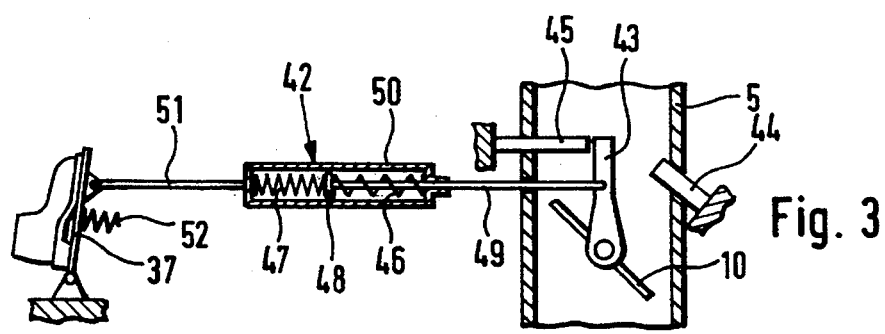
FIG. 3 shows a modified version of throttle valve actuation to vary the air intake cross section, with mechanical coupling between the gas pedal and throttle valve and with fixed stops.
Figure 4:
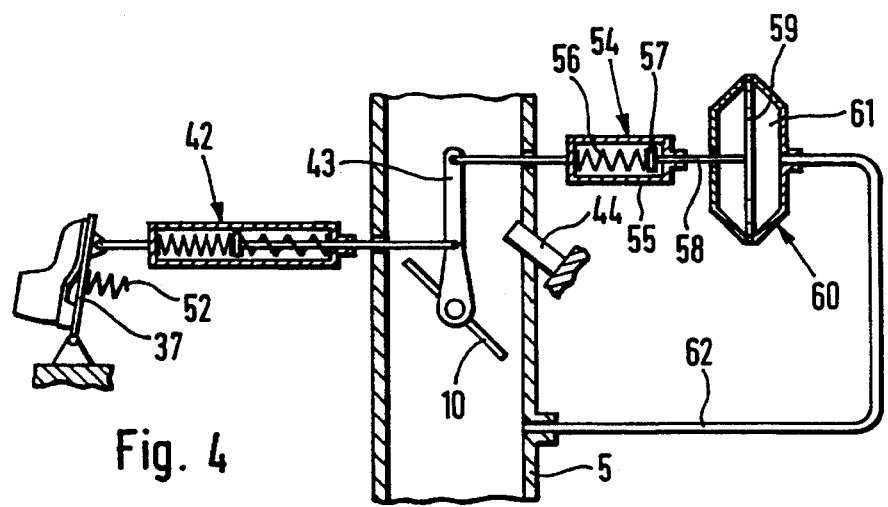
FIG. 4 shows a modification of the embodiment of FIG. 3, with a variable stop for the partial-load position of the throttle valve.

Range 2, the upper partial-load range, is then adjoined by a range 3, a middle partial-load range, in which the throttle device 10 is put in a partial opening position by the control unit 23, and the exhaust gas recirculation valve 12 is additionally triggered. In addition to the fuel quantity metered in accordance with the position of the gas pedal 37, exhaust gas recirculation quantities are delivered in regulated fashion, specifically as a function of the output signal of the oxygen sensor 39, resulting in an air ratio of lambda= 1. As a result of this mode of operation, consumption is improved, over a conventional mixture-aspirating engine with externally supplied ignition, because of the reduced charge change losses, and at the same time the opportunity is created of catalytically lowering exhaust emissions, via the exhaust gas recirculation and the established air number of lambda=1. The injection onset is again, corresponding to the still relatively high fuel injection quantity, in the range of 90° after top dead center of the engine piston. The opening position of the throttle valve may be defined by stops, as shown in detail in FIG. 3, or established as shown in FIG. 4. Here the partial-load stop is varied in such a way that an approximately constant intake tube negative pressure is established.

The range 3 is followed by an operating range 4, as an upper portion of the lower load range, and in which again as in range 3 the throttle device 10 assumes an essentially constant partially open position. For this range, a mode of operation with an air ratio of lambda>1 is provided, so that accurate regulation of the air ratio is no longer sought. Here, the transition to a fuel-saving lean mode is provided; to reduce throttle losses, control of the recirculated exhaust gas takes place, specifically as a function of the fuel injection quantity or the position of the gas pedal 37. Alternatively, however, the exhaust gas recirculation may also be done complementarily to the aspirated air quantity, so that a constantly uniform filling rate of the combustion chamber is adhered to. To that end, the aspirated air quantity is detected by an air quantity sensor 41, and the opening of the exhaust gas recirculation valve 12 is controlled in accordance with this air quantity. In the lean mode, with increasing leaning down and decreasing load, the instant of injection is constantly shifted from formerly 90° after top dead center in the intake stroke of the piston to the compression stroke, shortly before top dead center or before ignition of the fuel-air mixture. The shift of the injection onset is preferably done into the crankshaft angle range of 40° to 60° before top dead center. The injected fuel is introduced to the vicinity of the spark plug, so that despite a considerable overall leaning down in this range, an ignitable fuel-air mixture is formed, and the introduced fuel can thus be reliably ignited. In this range, the associated catalytic converter 40 can function only oxidatively, so that the lowering of NOx emissions in the exhaust gas is attained predominantly via the exhaust gas recirculation.

In the last range of the performance graph in FIG. 2, range 5, corresponding to a lower part of the lower load range, the throttle device 10 is again adjusted essentially to a constant partial opening, but exhaust gas recirculation no longer takes place, since for this range lambda values substantially higher than 1 are sought. Here the injection takes place in the compression stroke shortly before ignition, preferably in the crankshaft angle range between 40° and 60° before top dead center of the piston. With the aid of a throttle device opening limitation in accordance with the embodiment shown in FIG. 4, a constant intake tube negative pressure can be established, so that for this range no air numbers that are higher than lambda=2.5 result. For this value, optimal reduction of NOx formation takes place even without exhaust gas recirculation, prior to a further rise in NOx proportions at higher lambda air number values. At the same time, overly pronounced leaning down with its negative effects on engine running stability and the emission of uncombusted hydrocarbons is avoided.

The control of the throttle device 10 in operating range 2, and its adjustment in the other operating ranges, can be done electronically via the control unit 23, by sensing the gas pedal position and moving the throttle device under electronic control by the adjusting mechanism 25 to the correct position, in accordance with the various operating modes. However, a more favorable alternative is a mechanical or pneumatic throttle device adjustment as shown in FIGS. 3 and 4. This involves a mechanical connection between the gas pedal 37 and the throttle device 10; however, this connection is not rigid but rather is embodied such that complete closure of the throttle device at very small driving pedal angles is prevented. This can be done for instance with the aid of a drag member 42, inserted into the mechanical connection between the gas pedal and the throttle device; when the throttle device 10 has no load on it, or in other words when the adjusting lever 43 connected to it is not in contact with a full-load stop 44 or a partial-load stop 55, a quasi-rigid connection between the gas pedal 37 and the adjusting lever 43 is brought about. This is effected because of the springs 46 and 47 fastened in the drag member which keep a coupling plate 48, which is connected to the adjusting lever 43 via a rod linkage 49, in a middle position inside a spring capsule 50 of the drag member; this spring capsule receives the springs 46 and 47 on both sides of the coupling plate and is connected to the gas pedal 37 via a rod linkage 51. As a result of this embodiment, at small driving pedal angles corresponding to a smaller load than that specified by the partial opening of the throttle device, the driving pedal can return, by exertion of the force of the restoring spring 52 on it, with compression of the spring 46; the adjusting lever 43 remains at the partial-load stop 45, and the partial opening of the throttle device is unchanged. Since the gas pedal, with its position, determines the fuel injection quantity, it can carry out its control functions unhindered, without the throttle device being moved as far as the point where the coupling plate 48 assumes its neutral position, and the adjusting lever 43, lifting from the partial-load stop 45 by the now virtually rigid rod linkage 51, 49 is now moved toward the full-load stop 44, in the direction of further opening of the intake cross section. Once it has arrived at the full-load stop, the gas pedal can carry out still other adjusting motions counter to the force of the spring 47, so that an additional enriching of the fuel-air mixture in an acceleration situation can be carried out here by increasing the fuel injection quantity.

It may also be advantageous particularly for operating ranges 3–5 if the aspiration in the filling process of the combustion chamber 3 is not throttled overly severely. With the aid of the embodiment of FIG. 4, a partial-load stop that is variable within limits can be achieved here in the partial-load range. It is thus possible for the intake tube negative pressure to be kept virtually constant, so that as a consequence no air values over lambda=2.5 are established, and thus with respect to exhaust gas emissions and combustion stability, acceptable operating conditions are adhered to.

If in the engine overrunning range, that is, in which the gas pedal is not actuated but the engine rpm is higher than the idling rpm, a greater braking torque from the engine is needed, then it is also possible for the throttle device in this case to be closed entirely via a second barometric cell and via an electromagnet valve.

Control of the partial-load stop in the embodiment of FIG. 4 is done such that instead of the fixed partial-load stop 45, a drag member 54 is again provided, but is operative in only one direction. The adjusting lever 43 is connected to a spring capsule 55, in which a spring 56 is fastened and keeps a coupling plate 57 in contact with the outermost face end of the spring capsule. The coupling plate is connected via a rod linkage 58 to an adjusting diaphragm 59, which is fastened in a barometric cell 60, in which it defines a control pressure chamber 61, which communicates via a negative pressure line 62 with the intake tube 5 downstream of the throttle device 10. Depending on the magnitude of the negative pressure in the intake tube, the adjusting diaphragm 59 moves the coupling plate 57 more strongly toward the right; the spring capsule coupled via the spring 56 pulls the adjusting lever 43 to the right in the opening direction of the throttle device in this process. The coupling plate 57 thus acts as the partial-load stop, from which the adjusting lever 43 can be moved toward the full-load stop 44, counter to the force of the spring 56. If the coupling plate 57 rests on the spring capsule while the gas pedal 37 is retracted, however, then the gas pedal can be retracted by the deflection path of the drag member 42, even though the adjusting lever 43 is held stationary.

The fuel injection apparatus has been described above in terms of a so-called common rail injection apparatus, with which various injection instants can be optimally controlled within wide limits, and injection quantities can be accurately controlled. Instead of such an arrangement, however, some other injection apparatus may be used, such as an injection pump with an injection onset control device that is controllable over a wide range.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A method of operating a four-stroke internal combustion engine with externally supplied ignition and direct fuel injection into respective combustion chambers of said engine, which comprises:

causing an injection onset during a full-load operation during an intake stroke within a range of operation of a piston between top dead center (TDC) and bottom dead center (BDC) of an applicable cylinder of said engine and with an unthrottled delivery of air into a respective one of said combustion chambers;

causing an injection onset during a low load range of operation just prior to TDC and an ignition, within a predetermined operating range of an engine performance graph between said full-load operation and said low-load range of operation;

controlling an opening of the air intake cross section of said engine via an intake throttle device, said device being positioned as a function of a torque-demand input provided by a gas pedal position; and establishing a substantially constant position of said intake throttle device in other operating ranges for each of respective said other operating ranges;

controlling fuel injection quantities in accordance with said gas pedal position over an entire engine performance graph range; and controlling a recirculated exhaust gas quantity (EGR) within a specific operating range within a range internal to said entire engine performance graph range, said specific operating range adjoining said predetermined operating range in which said opening of an air intake cross section is controlled.

2. A method as defined by claim 1, which comprises varying the opening of the intake throttle device (10) as a function of the gas pedal position, regulating the fuel injection quantity in an upper partial-load range in accordance with an exhaust gas parameter, controlling the oxygen content of the exhaust gas to an air number on the order of lambda=1, and suppressing the exhaust gas recirculation.

3. A method as defined by claim 2, in which the fuel injection onset is located in the intake stroke of the piston of the applicable cylinder in the range of a crankshaft angle of 90° after the onset of aspiration at top dead center.

4. A method as defined by claim 1, in which in the operating range of the engine performance graph in which the intake throttle device assumes at least an essentially constant open position for the air intake cross section, in a full-load operating range, this open position, determined by a fixed stop for an actuation device of the intake throttle device (10), effects a full opening of the air intake cross section, and the exhaust gas recirculation is suppressed.

5. A method as defined by claim 2, in which in the operating range of the engine performance graph in which the intake throttle device assumes at least an essentially constant open position for the air intake cross section, in a full-load operating range, this open position, determined by a fixed stop for an actuation device of the intake throttle device (10), effects a full opening of the air intake cross section, and the exhaust gas recirculation is suppressed.

6. A method as defined by claim 3, in which in the operating range of the engine performance graph in which the intake throttle device assumes at least an essentially constant open position for the air intake cross section, in a full-load operating range, this open position, determined by a fixed stop for an actuation device of the intake throttle device (10), effects a full opening of the air intake cross section, and the exhaust gas recirculation is suppressed.

7. A method as defined by claim 1, in which in the operating range of the engine performance graph in which the intake throttle device (10) assumes an essentially constant open position for the air intake cross section, in a middle partial-load range located between the upper partial-load range and the lower load range, this opening position includes a partial opening of the air intake cross section, and regulating the exhaust gas recirculation by means of an exhaust gas recirculation quantity control device (12) as a function of an exhaust gas parameter, in particular the oxygen content of the exhaust gas, in such a way that an air value of lambda=1 is established.

8. A method as defined by claim 1, in which in the operating range of the engine performance graph in which the intake throttle device (10) assumes an essentially constant open position for the air intake cross section, in an upper part of the lower load range, this opening position effects a partial opening of the air intake cross section, and varying the exhaust gas recirculation by means of an exhaust gas recirculation control device actuated at least indirectly as a function of the load.

9. A method as defined by claim 8, which comprises varying the exhaust gas recirculation quantity as a function of the gas pedal position.

10. A method as defined by claim 8, which comprises varying the exhaust gas recirculation quantity as a function of the aspirated air quantity.

11. A method as defined by claim 7, in which the injection onset is located in the intake stroke of the applicable engine cylinder, a range of 90° after the onset of aspiration at top dead center of the engine piston.

12. A method as defined by claim 8, which comprising shifting the injection onset with decreasing load, from crankshaft angles located at a range of 90° after top dead center, to crankshaft angles of 40° to 60° before top dead center in the compression stroke of the applicable engine cylinder.

13. A method as defined by claim 1, in which in the operating range of the engine performance graph in which the intake throttle device (10) assumes an essentially constant open position for the air intake cross section, in a lower portion of the lower load range, the opening position of the intake throttle device effects a partial opening of the air intake cross section, and the exhaust gas recirculation is suppressed.

14. A method as defined by claim 13, in which the injection onset is located in the range of a crankshaft angle of 40° to 60° before top dead center in the compression stroke of the applicable engine cylinder.

15. A system for operating an internal combustion engine with externally supplied ignition and direct injection of fuel into respective combustion chambers of an engine in which: said engine is equipped with a plurality of cylinders, a piston operative in each of said cylinders, a series of combustion chambers defined by said piston in each of said cylinders;

at least one air intake line connected to said combustion chambers, a control valve for controlling air flow to each of said combustion chambers, at least one intake throttle device in at least one said air intake line, at least one exhaust line connected to each of said combustion chambers, an exhaust gas recirculation (EGR) line branching off from said at least one exhaust line and being connected to said at least one air intake line;

a control valve in said EGR line;

a fuel injection valve connected with each of said combustion chambers, a high pressure source connected to each said fuel injection valve via corresponding fuel lines, control means to control fuel flow to each of said fuel injection valves;

a control means for controlling said intake throttle devices;

a control means for controlling said control valve for said EGR line;

a control unit for controlling each of said fuel injection valves, said control means, said throttle control means and said EGR control valve;

a position transducer connected to a gas pedal which provides an output signal to said control unit which controls said injector valves with respect to an onset and duration of injection;

said control unit being connected to an exhaust gas sensor, an RPM transducer and a crankshaft angle encoder from which timing signals are extrapolated to perform selected functions at appropriate times.

16. A system as defined by claim 15, in which the control unit (23) is connected to a control output with an adjusting mechanism (25) for positioning the intake throttle device (10).

17. A system as defined by claim 15, in which the gas pedal (37) is connected via a drag member (42) to an actuation member (43) of the at least one intake throttle device (10), in which said actuation member (43) is adjustable between a full-load stop (44) and a partial-load stop (45), wherein the gas pedal is adjustable in the actuation direction for opening the intake throttle device (10), by way of the adjustment of the intake throttle device, to beyond the full-load stop with spring deflection of the drag member, and is likewise adjustable in the other direction, beyond the stop at the partial-load stop in the direction of closure of the intake throttle device, with deflection of the drag member.

18. A system as defined by claim 15, in which the control unit is connected to a control output having a control device of the exhaust gas recirculation control device (12) in the exhaust gas recirculation line (9).

19. An apparatus as defined by claim 17, in which the partial-load stop (44) is a fixed stop.

20. An apparatus as defined by claim 17, in which the partial-load stop is a stop (57) that is adjustable as a function of an intake tube negative pressure.

* * * * *